United States Patent [19]

Soubis

[11] 4,318,373
[45] Mar. 9, 1982

[54] TWO-STROKE MOTORS PRODUCING BETTER COMBUSTION AND PERMITTING A REDUCTION OF POLLUTION

[76] Inventor: Jean P. Soubis, 127, Residence Elysees II, La Celle Saint Cloud 78170, France

[21] Appl. No.: 173,933
[22] PCT Filed: Mar. 12, 1979
[86] PCT No.: PCT/FR79/00024
 § 371 Date: Aug. 6, 1979
 § 102(e) Date: Aug. 6, 1979
[87] PCT Pub. No.: WO79/00757
 PCT Pub. Date: Oct. 4, 1979

[30] Foreign Application Priority Data

Mar. 14, 1978 [FR] France .................. 78 07324

[51] Int. Cl.³ .................... F02B 33/04; F02M 25/06
[52] U.S. Cl. .................... 123/73 R; 173/73 A; 173/73 AC; 173/568
[58] Field of Search .................. 123/73 R, 73 A, 568, 123/74 R, 74 A, 73 SC

[56] References Cited

U.S. PATENT DOCUMENTS

| 904,267 | 11/1908 | Korting et al. | 123/73 A |
| 2,481,901 | 9/1949 | Bracke | 123/73 R |
| 3,687,118 | 8/1972 | Nomura | 123/73 R |
| 4,213,431 | 7/1980 | Onishi | 123/73 A |

FOREIGN PATENT DOCUMENTS

| 1451902 | 5/1969 | Fed. Rep. of Germany | 123/73 C |
| 2386684 | 12/1978 | France | 123/73 A |
| 153275 | 6/1932 | Switzerland | 123/73 A |

*Primary Examiner*—Wendell E. Burns
*Attorney, Agent, or Firm*—Pollock, VandeSande & Priddy

[57] ABSTRACT

Improvements in the operation cycle of a two-stroke engine. At least the scavenging residue which is in the exhaust manifold are sucked back into the crankcase of the engine, at the vicinity of the exhaust port of the cylinder independently of the feed system of the carburetor. The invention applies in particular to small engines allowing a reduction in pollution and improvement in efficiency.

8 Claims, 9 Drawing Figures

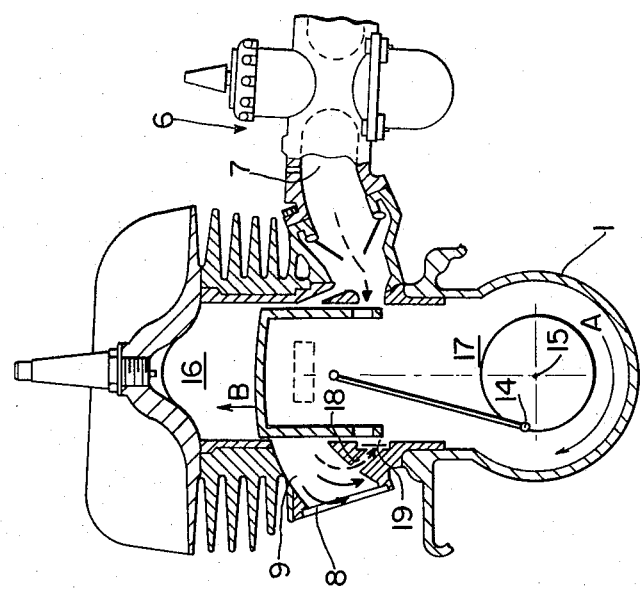
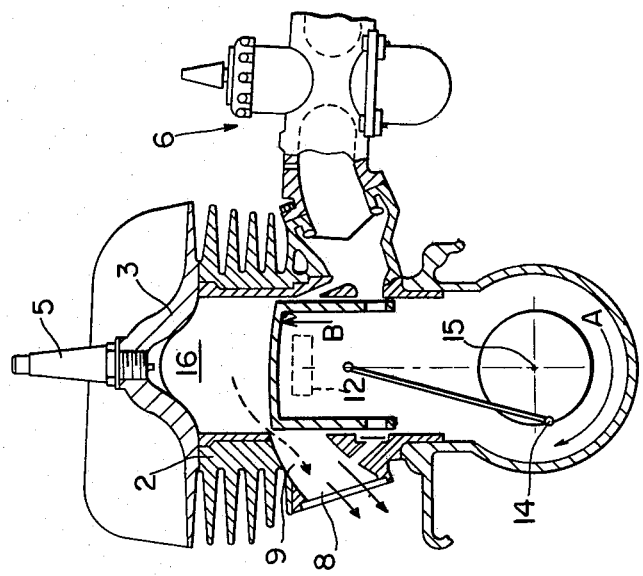
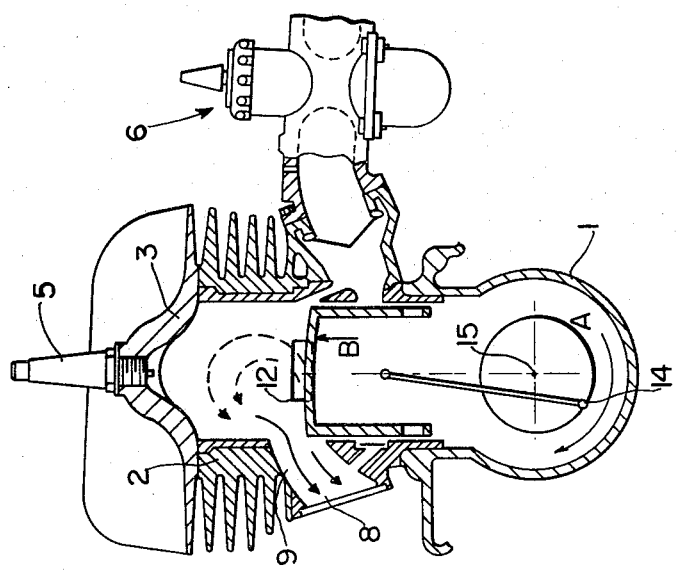

TWO-STROKE MOTORS PRODUCING BETTER COMBUSTION AND PERMITTING A REDUCTION OF POLLUTION

BACKGROUND OF THE INVENTION

With the increase of traffic, the problems of reducing the specific consumption of fuel and atmospheric pollution are becoming more and more serious.

As regards the four-stroke motor, progress made in both diesels and controlled ignition motors, particularly electronic, has led to impressive results which are being constantly improved.

The difficulty with the four-stroke motor is that to allow for good operating conditions, it is necessary to have all sorts of complicated, costly, relatively burdensome accessories, which are economically understood only if the effective power is relatively high to begin with.

The four-stroke motor can thus be considered as specifically meeting the current needs of the automobile. On the other hand, this motor is not well suited for motorcycles, with the exception of those with very large cubic capacity, and it is inconceivable to use it in the case of light-weight motorcycles.

With respect to motorcycles with small cubic capacity and small powers, the two-stroke motor seems far better suited. Indeed, because of its simpler technological conception as opposed to that of the four-stroke motor, the two-stroke motor makes it possible to produce small amounts of power with reduced cumbersomeness, weight and cost price.

With respect to utilization performance, efficiency is generally inferior to that of a four-stroke motor. However, in view of the low power levels considered and the ensuing low degree of consumption, this problem is not crucial.

BRIEF DESCRIPTION OF THE PRIOR ART

However, when speaking of pollution, the two-stroke motor is generally very much an agent of pollution, except if one is talking about an injection motor or a motor equipped with a catalytic post-combustion motor.

Unfortunately, the injection or catalytic post-combustion devices lead to implementation complexities which nearly double the cost price of the motor.

SUMMARY OF THE INVENTION

The purpose of the invention is, through an extremely simple modification of a classic two-stroke carburetor motor, to reduce considerably the pollution factor of such a motor, without influencing in effect the developed power or reducing efficiency. In som cases, even efficiency will be increased.

Pollution reduction will be accomplished first with regard to unburnt residue: hydrocarbons which are generally present in vast amounts in the exhaust of a two-stroke motor.

Carbon monoxide pollution will be also significantly reduced.

The improvements, which constitute the purpose of the invention, become clearly stated when, parallel to the feed circuit of the carburetor, scavenge residues which are found in the exhaust manifold close to the exhaust-port of the cylinder at least are sucked back into the crankcase of the motor. For example, one can control this renewed suction effort so that approximately 25% of the gases altered in the crankcase comes from this recycling, while the remaining 75% stems from carbureted fresh air which has gone through the carburetor. In this manner, one recycles part of the combustion agents, but also the quasi-totality of scavenge residues which contain unburnt hydrocarbons let into the cylinder with the carbureted fresh air.

Thus, one eliminates totally pollution in exhaust gases which is created by unburnt hydrocarbons. One reduces also carbon monoxide pollution, through partial recycling of exhaust gases. In general, the motor operates with a lower grade supply.

It is possible to correct by slightly enriching the carburetor the slight loss of power resulting maybe from such an operation and which will not be compensated by recycled hydrocarbon and carbon monoxide combustion.

The invention will apply particularly well to small cubic capacity motors, fed by a constricted carburetor operating at reduced output and low power, as in the case of motors for mopeds and motor cycles.

According to another characteristic of the invention, one will modulate advantageously the re-absorbed output of exhaust gases in function of that of the fresh gases let in through the intake manifold and the carburetor, as the two outputs vary generally and preferrably in the same direction. The variation function may or may not be linear.

For example, in order to implement the invention, it will be sufficient to create a passage in the motor which connects up the exhaust manifold in the vicinity of the exhaust port of the cylinder to an opening made in the cylinder linked to the interior of the crankcase when the piston clears toward the crankcase the main intake port connected to the carburetor. In fact, such a passage will be achieved with a simple borehole in the cylinder.

In order to attain the projected recycling rate, the passage will be achieved with a cross section which is inferior to that of the carburetor supplying the intake manifold with carbureted fresh air. For example, the sections will be chosen in order to reach a recycling rate between 15 and 35% and preferrably closer to 25%.

According to another characteristic of the invention, the passage will have a variable cross section, the variation of which will be controlled in function of the motor's operating conditions.

According to yet another characteristic of the invention, one will plan advantageously for a valve at the level of the opening of the said passage, thus preventing the discharge of gases compressed in the crankcase toward the exhaust.

The invention will have more clarity with the following description pertaining to the attached drawings, by offering simply as an example one mode of execution.

BRIEF DESCRIPTION OF THE DRAWINGS

In these drawings:

FIGS. 1 to 7 depict schematically and in section a motor which includes the improvements of the invention throughout various successive phases of one complete cycle or rotation of the drive shaft;

DETAILED DESCRIPTION

Figure 1:
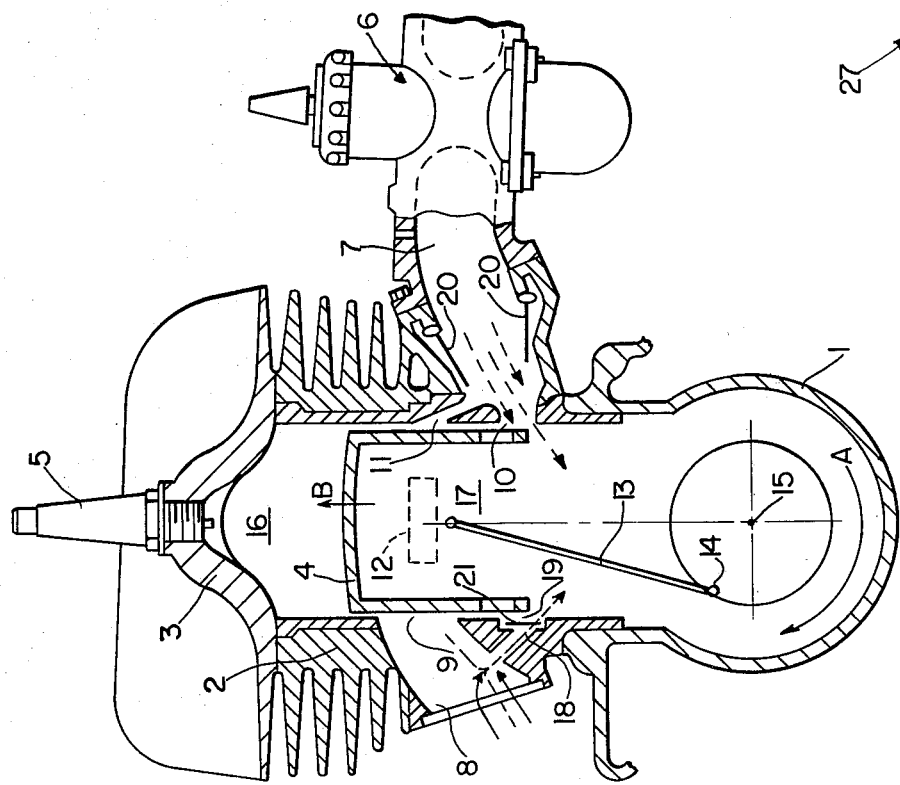

Firstly, in reference to FIG. 1, we will describe summarily the various basic constituent parts of a two-stroke motor fed by a carburetor.

Above crankcase 1, the motor is comprised of a cylinder 2 topped by a cylinder head 3 in which piston 4 is free to move. Numeral 5 depicts the spark plug and 6 the carburetor which enables the supply of intake manifold 7 with carbureted fresh air sucked by the motor. Numeral 8 depicts the exhaust manifold, which communicates with the interior of cylinder 2 by exhaust port 9.

On the other side, one notices at 10 the main intake port and at 11 the secondary or scavenge intake port. The transfer port is at 12, hidden by piston 4, and it goes through cylinder 2, communicating with the interior of crankcase 1 by way of a passage (not shown on the drawing).

When piston 4 moves back and forth in the motor activating with push-rod 13, throw 14 of the crankshaft (not shown) which turns around axis 15, the respective volumes of work chamber 16 above piston 4 and feed chamber 17 in crankcase 1 below the piston vary.

Everything which has been described thus far is entirely conventional.

Pursuant to the invention, a communication passage 18 is established between exhaust manifold 8 in the vicinity of its port 9 and the interior of cylinder 2. Passage 18 feeds into cylinder 2 through port 19, which in the example as illustrated is formed approximately opposite or facing main intake port 10.

The operation of the motor will now be detailed in function of FIGS. 1 to 8.

Figure 8:
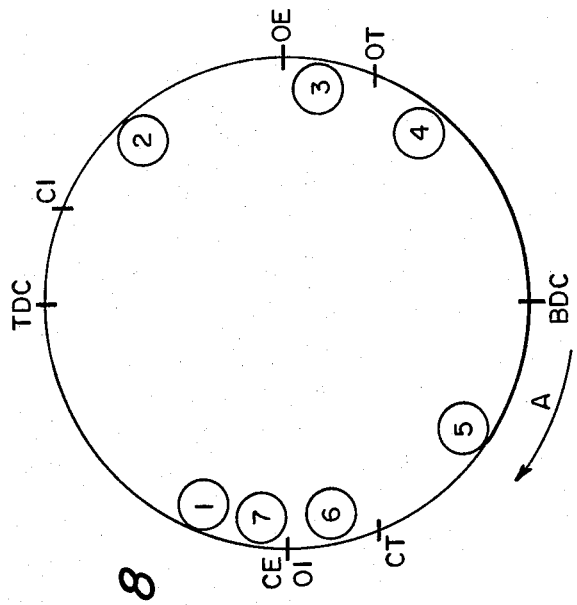
FIG. 8 is a diagram of the different positions in FIGS. 1 to 7 on a circle which shows the angle of rotation of the drive shaft, and the beginning and end of intake, exhaust and transfer.

While arrows A and B show respectively the direction of rotation of the drive shaft and the direction of displacement of the piston, the position illustrated in FIG. 1 has been identified by the encircled number 1 close to the circle in FIG. 8. For this angular position of the corresponding throw 14, the 68 degree example before the TDC (Top Dead Center) the exhaust is closed, as is the transfer, with compression beginning in work chamber 16.

The intake is open, the fresh carbureted gases having gone through carburetor 6 and intake manifold 7 is drawn into feed chamber 17, i.e., into the crankcase of the motor under piston 4, which is rising. Intake valves 20 have parted, allowing the carbureted fresh air to be admitted in the crankcase.

Simultaneously, via passage 18 and port 19 which is cleared by piston 4 at the same time as port 10, there occurs likewise a suction of gas present in exhaust manifold 8 in the vicinity of port 9.

In fact, as will become clearer when the previous stage of the cycle is described as shown in FIG. 7, one can find essentially in this area scavenge residue of the exhaust which has just been closed.

Thus, parallel to the intake of carbureted fresh air let in through main intake port 10 the scavenge residues are sucked back into chamber 17 inside crankcase 1.

Figure 2:
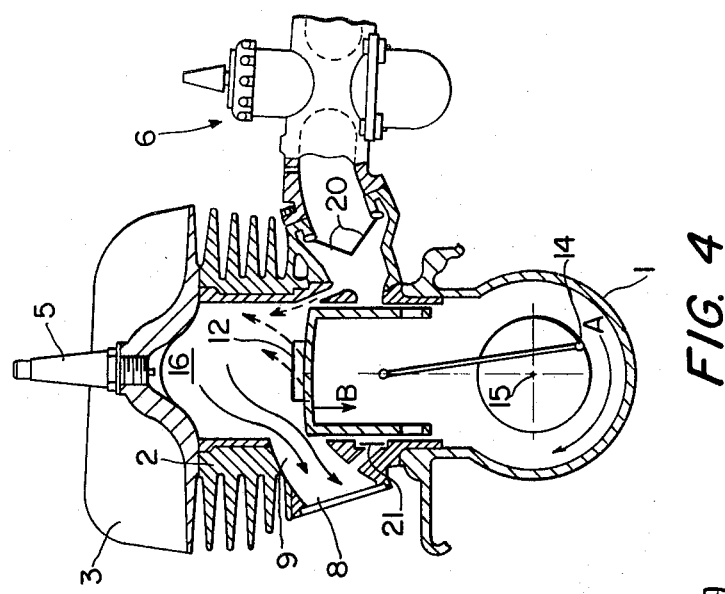

Let us now turn to FIG. 2 which shows a corresponding subsequent position (FIG. 8) at a subsequent moment of operation when piston 4 descends (arrow B), having passed the TDC, with throw 14 reaching the 40 degree angular position after TDC.

For this position, ignition has already taken place and the start of the power stroke which produces the driving force inside the cylinder is in its initial stage. Exhaust 9 is closed, as is transfer 12, the ports of which are covered by the skirt of piston 4.

The intake, through main intake port 10 as well as through the renewed suction intake port 9, is closed by the operation of valves 20 of the main intake and by valve 21 for port 19. The configuration of such a valve will be described in reference to the execution example shown in FIG. 9. In FIG. 8, the angular position of throw 14 which leads to the closing of the intake has been marked CI.

As piston 4 descends, compression begins under the piston in feed chamber 17 formed inside cylinder 2 and crankcase 1.

Figure 3:
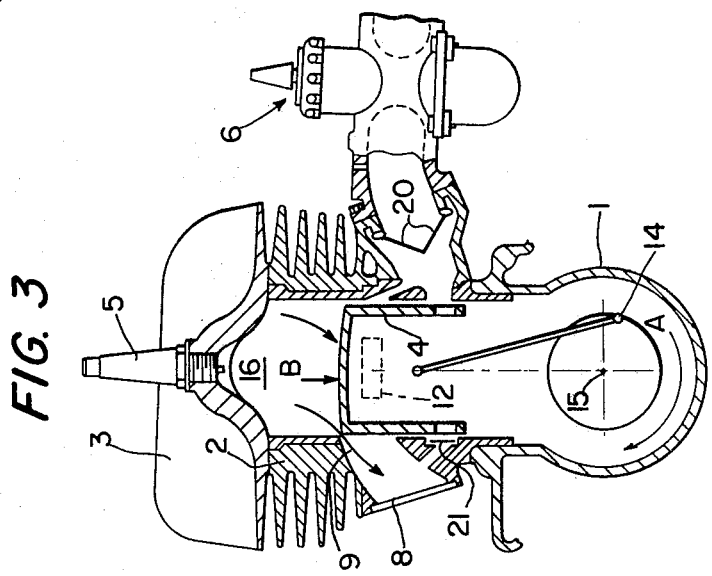

As the cycle proceeds, the next phase is depicted in FIG. 3 for a throw angular position marked 3 on FIG. 8 and found at 97 degrees after TDC.

For this position, the power stroke is continuing in chamber 16. Exhaust port 9 is being gradually uncovered by piston 4. Escapement starts. The initial opening of the exhaust has been marked OE on FIG. 8. Transfer 12 is still closed, as is the intake, the ports of which are now covered by the skirt of piston 4. As the piston descends, compression in the crankcase continues of those gases which will be drawn into the cylinder chamber.

Figure 4:
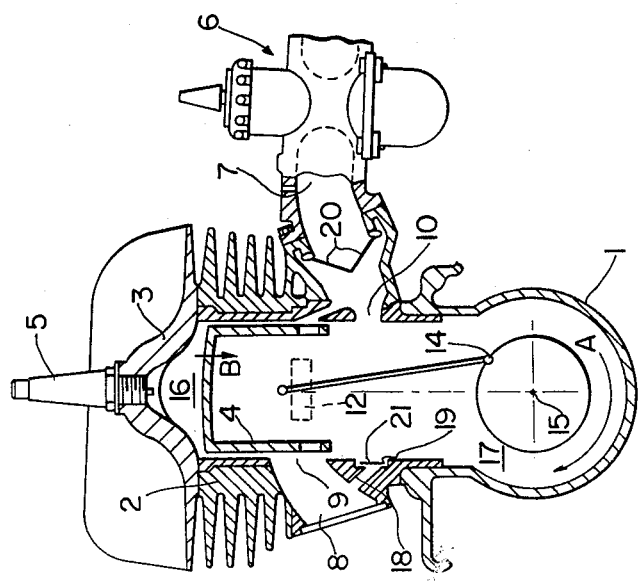

As the power stroke proceeds, a subsequent stage of operation is shown in FIG. 4.

For the position shown in this figure and angularly marked 4 on FIG. 8, the transfer has begun. The operation of the transfer is marked OT on FIG. 8, and it has been assumed that it took place a little before angular position 4 which, in the example shown, has been selected at 128 degrees after TDC.

The fresh gases, and those which have been sucked back into the exhaust and have been compressed inside crankcase 1 are now transferred through port 12 which is cleared by piston 4 in chamber 16. Their path is shown by the outlined arrows.

Exhaust port 9 has been fully cleared now by piston 4 and scavenging of chamber 16 begun, the volume of which is close to the initial maximum volume.

Scavenging also takes place at port 11 which is cleared by the piston, thus encouraging the horse-shoe scavenge of the chamber as depicted by the arrows. In other words, in this exhaust phase, the fresh gases admitted by transfer 12 thrust before them and replace the burnt gases. In this phase of operation, the gases which are escaping through exhaust port 9 are composed almost exclusively of combustion gases free of unburnt residue and shown by solid arrows.

As the operation proceeds, we described in FIG. 5 the phase wherein the piston has gone beyond BDC (Bottom Dead Center), and goes back up to chamber 16. The illustrated angular position corresponds to 40 degrees after BDC.

In this position, the exhaust is still open, as is the transfer, while the intake is closed. The fresh transfer gases are beginning to fill substantially all of the volume in chamber 16, without having yet reached however the area of the chamber near exhaust port 9.

A moment later, transfer port 12 will be closed by piston 4, which is continuing its climb, the closing of the transfer having been shown as CT in FIG. 8.

A moment later, in the position illustrated in FIG. 6, the transfer is closed. For this angular position, shown at 80 degrees above BDC, at 6 in FIG. 8, the exhaust is not yet closed, such closing occurring a little later, at the point marked CE (FIG. 8). Scavenging chamber 16 ends, the fresh gases having filled the entire chamber and a portion thereof escaping through exhaust port 9.

As piston 4 rises still a little higher, we reach the position marked 7 in FIG. 8 and shown in FIG. 7. In this angular position, indicated at 98 degrees after BDC, one notes that the exhaust has been closed (at point CE), while the intake just opened (at point OI).

In chamber 16, the fresh gases previously admitted are compressed. In chamber 17, the volume of which is increasing, and is therefore in suction, fresh gases from carburetor 6 and intake manifold, on the one hand, are sucked, and gases present in exhaust manifold 8 in the vicinity of port 9, on the other hand, through passage 18 and port 19.

These gases sucked back into the exhaust manifold are obviously the scavenge residue which were previously thrust out. Thus, the effective repeated suction of these scavenge residues is ensured, which permits a reduction of pollution. It will be noted that this is obtained very simply and can be applied to any two-stroke motor with a carburetor, at minimal modification cost.

Motor operating performance is generally improved due to the more complete combustion that occurs.

Power is not reduced, especially if one makes sure when necessary to increase somewhat the intake section at the carburetor.

In the operating example that has just been described, we defined accurately the succession of the motor's various operating strokes as related to the angular position of the shaft. It must be clearly understood that these specifications have been given only to illustrate the operation clearly, as the angular positions may be different, and dependent in particular on the configuration of the chamber, the piston and the ports.

Figure 9:
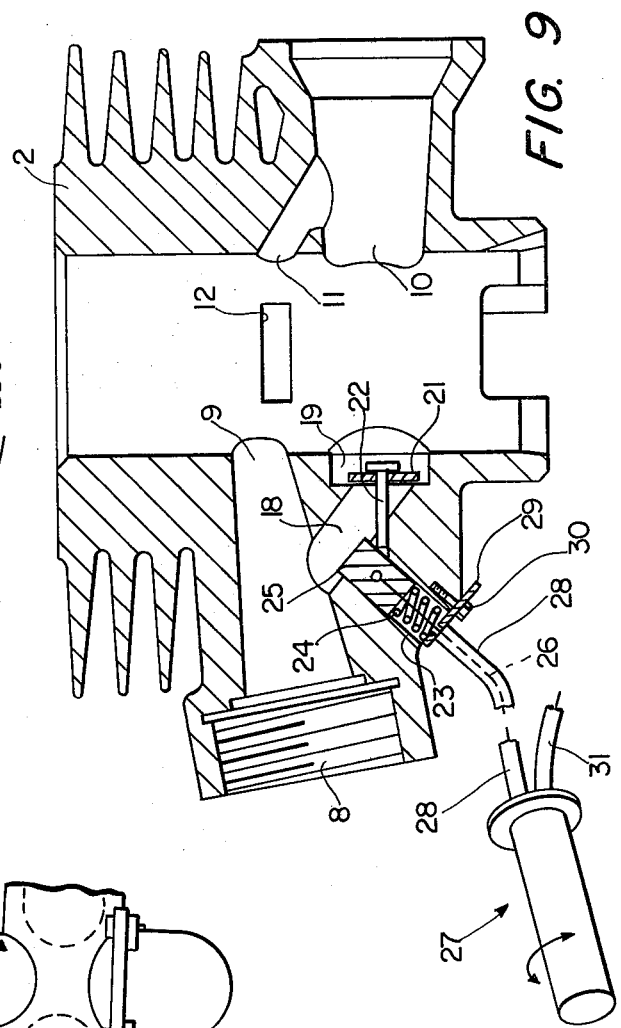
FIG. 9 shows on a larger scale a modification of a conventional motor at the level of the exhaust port which permits the execution of the invention.

We will describe now, as related to FIG. 9, an execution of passage 18 which allows for renewed suction of the scavenge residue.

In FIG. 9, cylinder 2 was shown together with its main intake port 10, its secondary scavenge intake port 11, its exhaust port 9, emerging into exhaust manifold 8, and its transfer port 12.

An opening was drilled obliquely, connecting exhaust 8 with the interior of cylinder 2. Channel 18 opens into the cylinder through an orifice or port 19 which is situated at the same height and approximately opposite intake port 10.

In orifice 19 a metallic washer 21 is placed, which is threaded on a screw 22. This washer forms an antidamper valve, preventing the compressed gases in the crankcase from flowing back toward the exhaust.

Thus, in the intake phase, when the prevailing pressure in the crankcase is lower than the atmospheric pressure, the crankcase is being fed both by passage 18 and valve 21, which opens, and by port 10.

Transversely to the direction of passage 18, an orifice 23 was drilled in which a little piston 25 locked with cable 26 of a sheathed cable control 27, is resisted by a spring 24. For control, sheath 28 of the cable rests on a metal disc 29 held in place by a screw 30.

Control 27 of the cable may be the motor's accelerator control bearing on a second sheathed cable 31 in the usual conventional manner.

With such an arrangement, one understands that when the throttle lever is controlled toward the opening, passage 18 is cleared, while when the throttle control is released, spring 24 brings piston 25 back into the passage, thus obstructing it.

It is clear that in this manner one can regulate together the amount of gases sucked back into the exhaust and that of the fresh gases admitted from the carburetor and the intake manifold.

Control can be achieved proportionately, or even according to any other rule, in function of the calibration of spring 24, the form of throttle chamber 25, the cable drive control, etc.

It is understood that the invention is in no way limited to the method of execution illustrated and described, which has served only as an example, the invention including all technical equivalencies for the means described as well as their combinations if they are achieved in its spirit and put into effect within the framework of the following claims.

Thus, in particular, the control of the intake way of passage 18 (FIG. 9) may be regulated automatically, for example, by a manometric capsule which detects the pressure which prevails in the intake manifold and/or the exhaust manifold.

Similarly, instead of oblique borehole 18, the passage could be made with two boreholes at right angles which open onto the outside, and which would be closed off with stoppers at the outer extremity.

What is claimed is:

1. In a two-cycle engine provided with fuel from a constricted carburetor, the engine comprising:
    a cylinder communicating with a crankcase;
    a piston reciprocating in the cylinder;
    a first chamber located on one side of the piston confronting the crankcase;
    a second chamber located on the opposite side of the piston whereat ignition occurs;
    scavenging port means located in the cylinder for permitting combustible gases to flow from the first to the second chamber at a preselected position of the piston stroke;
    an exhaust manifold extending outwardly from the cylinder for exhausting ignited gases therefrom, the ignited gases being displaced in the exhaust manifold by combustible scavenged residue from the second chamber; and
    port means located in the exhaust manifold for directing scavenged residue in the exhaust manifold, into the first chamber for recycling thereby avoiding exhausting of the combustible residue from the exhaust manifold.

2. The structure of claim 1 wherein the port means comprises vertically displaced first and second exhaust ports located between the cylinder and the manifold, the first exhaust port being lower than the second exhaust port;
    a passageway formed between the exhaust manifold and the first exhaust port which permits communication between the second exhaust port and the first chamber, via the exhaust manifold, when the piston is displaced free of the first exhaust port.

3. The structure set forth in claim 2 together with an inlet port formed in the cylinder for permitting communication between the carburetor and the first chamber, through an inlet manifold, when the piston is displaced free of the inlet port.

4. The structure set forth in claim 3 wherein the first exhaust port is located at substantially the same height as the inlet port.

5. The structure set forth in claim 3 wherein the cross section of the first exhaust port is substantially less than that of the inlet port.

6. The structure set forth in claim 3 together with means for varying the cross section of the passageway.

7. The structure set forth in claim 6 wherein the means for varying the passageway cross section comprises:
   a throttle chamber communicating with the passageway;
   a throttle member positioned in the throttle chamber;
   means for controlling displacement of the throttle member;
   detecting means located in one of the manifolds; and
   means connecting the detecting means to the controlling means for displacing the throttle member in accordance with pressure conditions in the manifold.

8. The structure set forth in claim 7 together with check valve means located in the first exhaust port for preventing gas flow from the first chamber to the exhaust manifold.